(12) United States Patent
Vidal Rudloff

(10) Patent No.: US 8,302,564 B2
(45) Date of Patent: Nov. 6, 2012

(54) AQUACULTURE NET WITH POLYGONAL BOTTOM

(75) Inventor: Guillermo Alejandro Vidal Rudloff, Talcahuano (CL)

(73) Assignee: NV Bekaert SA, Zwevegem (BE)

(*) Notice: Subject to any disclaimer, the term of this patent is extended or adjusted under 35 U.S.C. 154(b) by 17 days.

(21) Appl. No.: 12/867,023

(22) PCT Filed: Jan. 28, 2009

(86) PCT No.: PCT/EP2009/050926
§ 371 (c)(1),
(2), (4) Date: Aug. 10, 2010

(87) PCT Pub. No.: WO2009/115361
PCT Pub. Date: Sep. 24, 2009

(65) Prior Publication Data
US 2010/0319625 A1 Dec. 23, 2010

(30) Foreign Application Priority Data
Mar. 19, 2008 (EP) .................... 08152997

(51) Int. Cl.
*A01K 61/00* (2006.01)
(52) U.S. Cl. ............................... 119/223
(58) Field of Classification Search .......... 119/223, 119/221; 43/7, 11, 12, 14
See application file for complete search history.

(56) References Cited

U.S. PATENT DOCUMENTS

| | | | | |
|---|---|---|---|---|
| 4,072,295 A * | 2/1978 | Roberts | ........ | 256/26 |
| 4,138,790 A * | 2/1979 | Schmucker | ........ | 43/12 |
| 4,145,030 A * | 3/1979 | Ingraham | ........ | 256/1 |
| 4,615,301 A | 10/1986 | Maekawa et al. | | |
| 4,673,015 A * | 6/1987 | Andreasson | ........ | 152/231 |
| 4,790,098 A * | 12/1988 | Lu | ........ | 43/7 |
| 5,439,713 A * | 8/1995 | Yamaoka et al. | ........ | 427/433 |
| 5,617,813 A * | 4/1997 | Loverich et al. | ........ | 119/223 |
| 6,065,239 A * | 5/2000 | Thomas et al. | ........ | 43/4.5 |
| 6,719,276 B1 * | 4/2004 | Bush | ........ | 256/1 |
| 6,823,901 B1 * | 11/2004 | Garcia | ........ | 140/92.7 |
| 2006/0102087 A1 * | 5/2006 | Page | ........ | 119/223 |
| 2008/0000429 A1 * | 1/2008 | Page | ........ | 119/223 |
| 2008/0202441 A1 * | 8/2008 | Kunz Astete et al. | ........ | 119/201 |
| 2009/0229531 A1 * | 9/2009 | Stillman | ........ | 119/215 |
| 2009/0266304 A1 * | 10/2009 | Page | ........ | 119/223 |
| 2010/0294201 A1 * | 11/2010 | Amils et al. | ........ | 119/201 |
| 2011/0048331 A1 | 3/2011 | Vidal Rudloff et al. | | |
| 2011/0114028 A1 * | 5/2011 | Coffin et al. | ........ | 119/201 |

FOREIGN PATENT DOCUMENTS

| | | | |
|---|---|---|---|
| GB | 2184631 A * | 7/1987 | |
| GB | 2437642 A | 10/2007 | |
| WO | WO 89/06902 A1 | 8/1989 | |
| WO | WO 2007/031352 A1 | 3/2007 | |

* cited by examiner

*Primary Examiner* — Yvonne Abbott
(74) *Attorney, Agent, or Firm* — Foley & Lardner LLP

(57) ABSTRACT

An aquaculture net for a circular raft and a polygonal bottom, preferably octagonal bottom is provided. The advantages are an increase in volume and an even load distribution.

14 Claims, 3 Drawing Sheets

AQUACULTURE NET WITH POLYGONAL BOTTOM

TECHNICAL FIELD

The invention relates to an aquaculture net having a top for attaching to a raft in the form of a circle.

BACKGROUND ART

Aquaculture nets or fish-farming nets are used to raise aquatic life such as fish. The aquaculture net keeps the aquatic life controlled and contained and protects the aquatic life inside the net against predators such as sharks, sea lions or sea wolfs.

The dimensions of such an aquaculture net are considerable. An example of a typical dimension is 30 m×30 m×15 m, the last dimension being the depth of the net inside the water and the first two dimensions being the width and length of the net at the water surface. The net may be formed of a polymer wire or of a coated steel wire. As a matter of example only, a net made of galvanized steel wire and of the above-mentioned dimensions has a weight above 4 metric Tons.

The aquaculture nets are usually of the chain link fence type. This is a fence of steel wires woven into a diamond pattern. The meshes have a dimension that is smaller than the dimension of the fish contained in the nets. Each steel wire is preformed by bending so that it exhibits a wavy pattern with maxima and minima. The maxima of a steel wire interlock with the minima of a neighboring wire to form the patterns of a series of diamonds.

Aquaculture nets of the chain link fence type have proven to be successful to control the aquatic life and to protect against predators. Aquaculture nets with galvanized steel wires offer an acceptable resistance against bio-fouling, i.e. against fouling material that may grow on the mesh structure. Within the context of the present invention, the terms fouling material refer to fouling organisms such as barnacles, algae or molluscs, which may attach and grow to the wire material of the mesh structure. This fouling mechanism is so persistent that entire openings in the meshes may be filled blocking any introduction of fresh water or nutrition into the volume inside the mesh structure.

A main part of the aquaculture nets have circular rafts, i.e. the top of the aquaculture net has the form of a circle. Fish and predator nets are hanging on these rafts and must provide the required volume for fish growing. An existing embodiment (see FIG. 1) provides an aquaculture net 10 with a circular top 12 and a square bottom (cube) cage 14. The side walls 16 connect the square bottom 14 to the top 12. Although wide spread in use, such a cage however has two main disadvantages.

A first disadvantage is the reduction of the contained volume with 11%. Take as a matter of example, a 30 m diameter cage with a 94.2 m perimeter and an area of 707 m². To fit a square cage in the same perimeter, the side of the square must be of 23.6 m length, with an area of 555 m². By having a cage with square bottom and circular upper section, the mean or average area is 613 m², corresponding to 89% of the area of the circular upper section. Thus the inner volume of the aquaculture net will also be reduced to the same degree, i.e. 11%. This 11% loss in volume may be compensated by increasing the net depth, however leading to a weight increase of the net. This weight increase is preferably avoided, since it may drastically reduce the life time of the aquaculture net due to the fact that the upper wires constituting net have the carry the total weight of the net and are subjected to severe external conditions such as the tidings in an aggressive environment as sea water.

A second disadvantage is the uneven load (weight) distribution applied to the upper circular part of the raft. The load applied in a point corresponding to a corner of the square bottom is 25% under the mean weight, while the load applied in a point corresponding to the middle of each square's side is 25% above the mean weight. Thus, the raft tends to deform and may break under severe conditions. The uneven load may be partly solved by adding extra counterweights in determined points of the net. Again, however, this solution increases the total weight of the net, which is to be avoided because of the reasons mentioned above.

DISCLOSURE OF INVENTION

It is an object of the invention to avoid the disadvantages of the prior art.

It is a further object of the invention to provide an aquaculture net for circular rafts wherein volume reduction is kept to a minimum.

It is yet a further object of the invention to provide an aquaculture net with an even load (weight) distribution.

The optimal solution to this technical problem is to provide an aquaculture net having a circular bottom. However, the chain link mesh cannot be cut into a perfect circular shape. In fact, due to its construction, only square meshes or meshes in the form of a diamond are fabricated.

Therefore, it is an object of the invention to provide an aquaculture net having a bottom shape as close to a circular shape as technically feasible, e.g. in the form of a regular octagon.

In one embodiment the bottom of the net comprises eight parts of chain link mesh in the form of equilateral triangles. These eight triangles form the octagon.

In an alternative embodiment the bottom is made of parts of chain link meshes in the forms of squares and equilateral triangles.

In yet another embodiment the bottom is made of one single part of chain link mesh in the form of an octagon.

According to an embodiment of the invention there is provided an aquaculture net having a top for attaching to a raft in the form of a circle, wherein the bottom of the net is a polygon. This polygon comprises five or more edges.

Preferably the polygon is inscribed in a second circle and has a surface area that is greater than the surface area of a square that is inscribed in this second circle.

The polygon is preferably a regular octagon, comprising eight edges.

In a first embodiment the octagon is formed by eight 45° equilateral triangular mesh structures. In a second embodiment the octagon is formed by four 90° equilateral triangular mesh structures and by a cross of five square mesh structures. In a third embodiment said octagon is formed by a single mesh structure where the mesh structure is in the form of a square where its four corners have cut afterwards to form four additional sides or where the operator, when making the mesh, ends the chain links to form an octagon (see below).

The radius of the circumscribing circle of the polygon or octagon is preferably equal to the radius of the circle of the raft at the top.

In a preferable embodiment the aquaculture net is foldable or folded.

The aquaculture net according to the invention is preferably a chain link fence, made of steel wires. The steel wires have a wire diameter that is preferably smaller than 4.5 mm, e.g. 4.0 mm or 3.0 mm.

The aquaculture net may be further treated against biofouling and corrosion, and has dimensions which are greater than 1 m×1 m (diameter circle×depth).

The invention further provides a method of manufacturing an aquaculture net having a top for attaching to a raft in the form of a circle. The method comprises the steps of a) providing one or more chain link mesh structures in the form of equilateral triangles, b) possibly providing one or more chain link mesh structures in the form of a square, c) assembling the chain link mesh structures of step a) and/or b) as to form a polygonal bottom, d) connecting said polygonal bottom to a chain link mesh which forms a side wall, d) connecting said side wall to the raft.

The aquaculture net of the present invention has two main advantages: an optimal volume and an even load (weight) distribution.

According to a particular and independent aspect of the invention, there is provided a chain link mesh structure in the form of a triangle. This triangular chain link mesh can be manufactured and sold independent of its use as part of an aquaculture net and can be used as fence or as part as a fence. It can also be used in mining and tunnels.

BRIEF DESCRIPTION OF FIGURES IN THE DRAWINGS

Figure 4A:
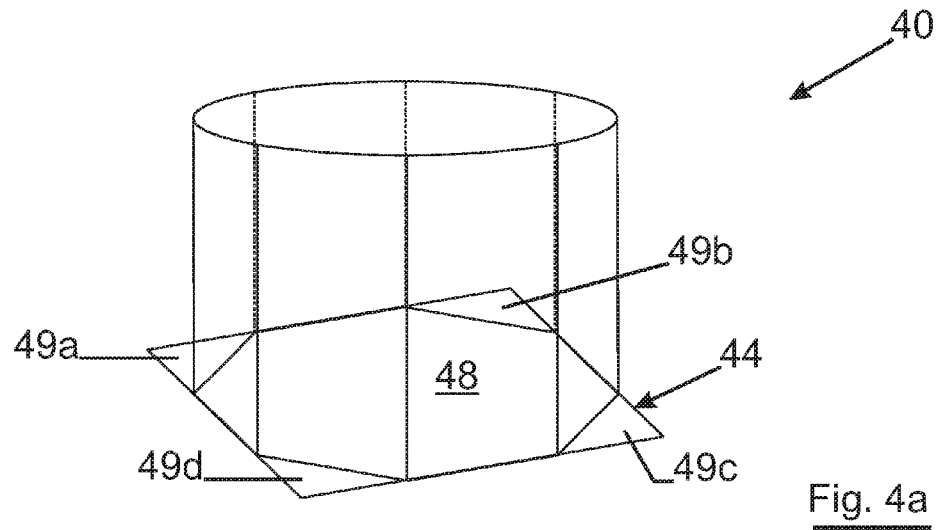
Figure 4B:
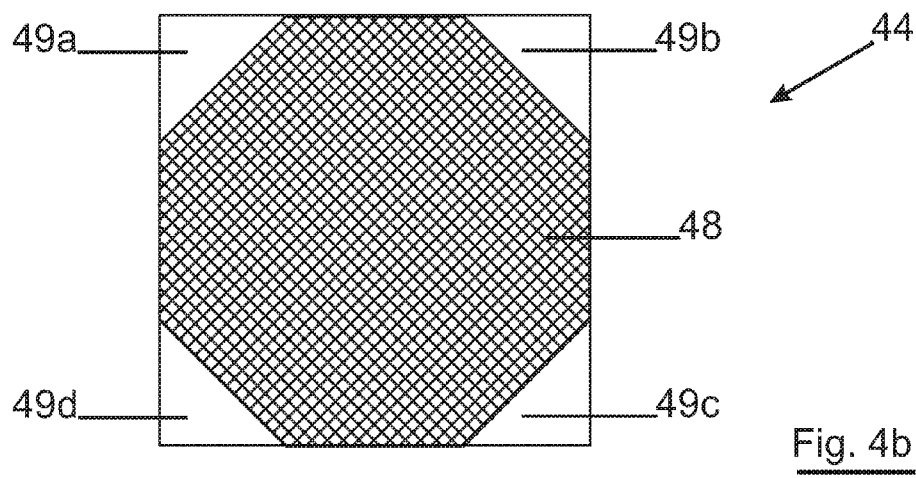

FIG. 4a-b shows a third embodiment of an aquaculture net according to the invention having a circular top and an octagonal bottom out of one single chain link mesh structure.

Figure 5:
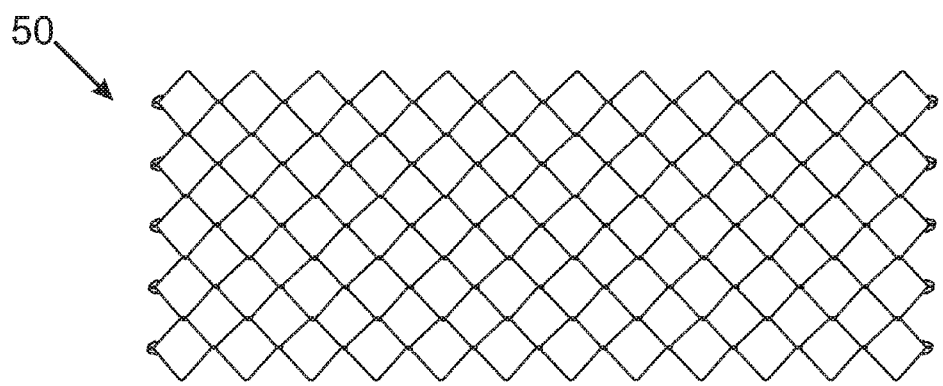

FIG. 5 shows a square shaped chain link mesh by normal construction.

Figure 6:
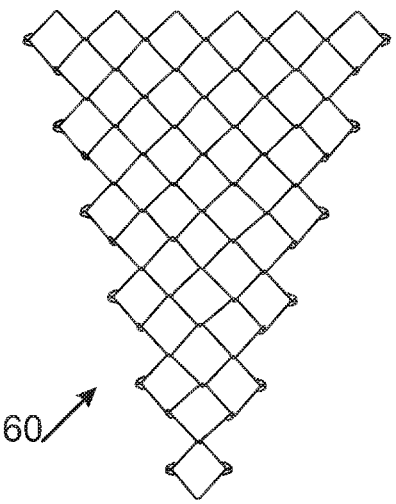

FIG. 6 shows a chain link mesh structure in the form of an equilateral triangle with a top angle of 45° according to the invention.

Figure 7:
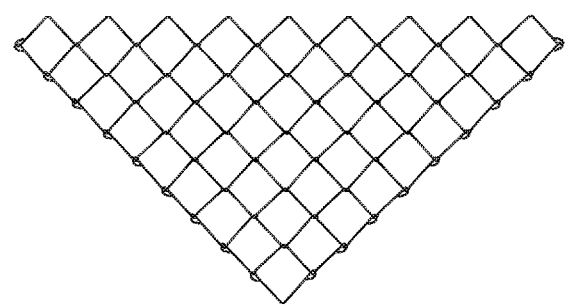

FIG. 7 shows a chain link mesh structure in the form of an equilateral triangle with a top angle of 90° according to the invention.

Figure 8:
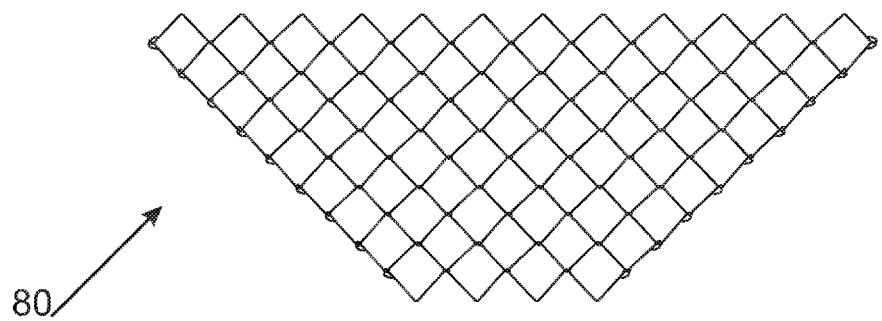

FIG. 8 shows a chain link mesh structure in the form of an octagon.

MODES(S) FOR CARRYING OUT THE INVENTION

Figure 1:
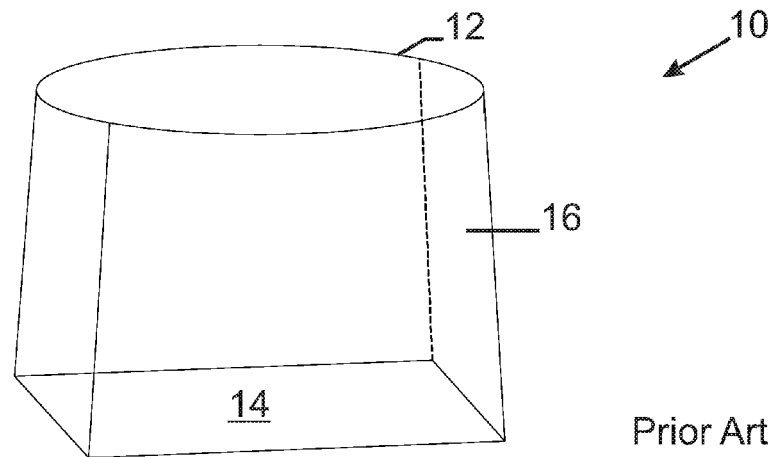
FIG. 1 shows a prior art aquaculture net having a circular top and square bottom (cube) cage.
Figure 2:
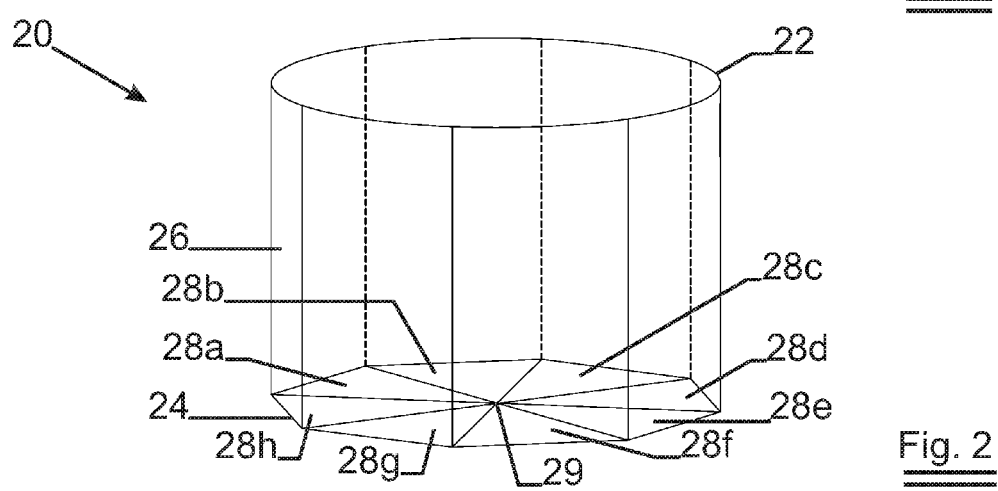
FIG. 2 shows a first embodiment of an aquaculture net according to the invention having a circular top and an octagonal bottom comprising eight triangles.

FIG. 2 illustrates a first embodiment of an aquaculture net 20 according to the invention having a circular top 22 and a (regular) octagonal bottom 24 comprising eight equilateral triangles 28a-h with a top angle of 45°. The side wall of the net 26 is a rectangular mesh connected to the circular top 22. The side wall of the net 26 may be provided in one or more parts. The tip op the equilateral triangles is connected in one point 29 at the center of the bottom of the net. The base side of the triangles is connected to the side wall 26 of the net (as shown in FIG. 2).

The connection of the various parts (triangles and squares) in this embodiment and also in other embodiments may be done in several ways. One way is by using ordinary binding wire. Another way is by using a helical wire or a rope going through overlapping openings. Still another way is to use clips.

In an alternative embodiment each of the eight equilateral triangles forms one single piece with a corresponding part of the side wall. So the net is formed by eight rectangular parts of chain link mesh which form the side wall and those parts end in a triangle, whereby the eight triangles form the bottom. In this alternative embodiment a seam is avoided between the bottom part and the wall part.

The embodiment of FIG. 2 is particularly suitable for use when the cage is to be installed in a raft that is floating in the sea. That is, unfolding the cage, to which several buoys have been fixed, from a ship directly to the sea. The cage then remains floating from the buoys and the upper part is opened and fixed to the raft.

For constructing a cage, i.e. the connection of the various parts, with the above mentioned design, the construction can be started on one of the eight sides, or on part of it.

The octagonal shaped bottom very closely approximates an optimal circular bottom shape. In a preferable embodiment the radius of the circumcircle of the octagonal/polygonal bottom is equal to the radius of the circular top of the net. There is little or no loss of volume and there is no need for greater depths, thereby avoiding increasing the weight of the net. In addition, there is an even weight distribution on the raft thus avoiding deformation of the raft. In another embodiment the circumcircle of the octagonal/polygonal bottom is smaller or greater than the radius of the circular top of the net.

Figure 3:
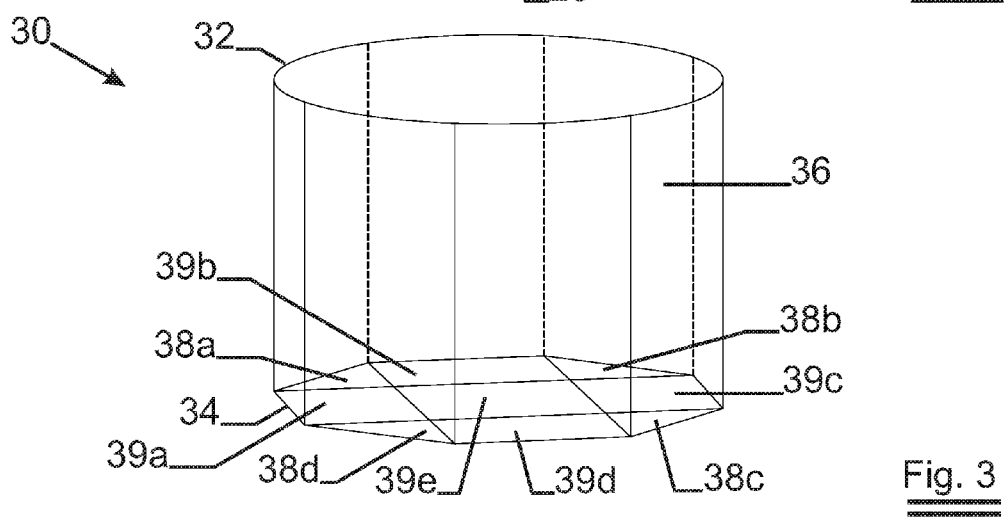
FIG. 3 shows a second embodiment of an aquaculture net according to the invention having a circular top and an octagonal bottom comprising four triangles and a cross of squares.

FIG. 3 illustrates a second embodiment of an aquaculture net 30 according to the invention having a circular top 32 and an octagonal bottom 34 comprising four equilateral triangles 38a-d with a top angle of 90° and a cross of squares 39a-e. The side wall of the net 36 is a rectangular mesh connected to the circular top 32. The triangular and square parts are connected to each other and to the circular bottom 34 of the net. An octagonal bottom requires four triangles with an angle of 90° at the tip.

The embodiment of FIG. 3 is suitable for use when the cage is to be installed in a raft that is on a beach. That is, the cage is unfolded on the beach, with low tide, and then the raft is positioned above it with high tide. The upper part of the cage is then lifted and fixed to the raft.

For constructing a cage with the above mentioned design, i.e. for the connection of the various parts, the construction can be started from the bottom.

In an alternative embodiment, the cross of squares 39a-e comprises e.g. a single rectangular part formed by e.g. 39a-e-c whereby two squares 39b and 39d are added thereby avoiding the inner seams in rectangle 39a-e-c.

FIG. 4a illustrates a third embodiment of an aquaculture net 40 wherein the bottom of the net 44 (FIG. 4b) is an octagon 48 made of one single piece.

This octagonal bottom 48 can be made in two ways.

A first way is to start from a square piece. Thereafter four corners 49a-d may be cut off thereby forming additional four sides of an octagon. See FIG. 4b.

A second way is to directly manufacture the octagon, thereby avoiding to cut off pieces afterwards.

Other embodiments may include differently shaped mesh pieces for forming the polygonal bottom part of the net, or the entire net as such. Examples include but are not limited to rectangular, square, triangular or polygonal pieces, connected either to the circular bottom side of the net or either to the circular top of the net, and partly avoiding bottom or side seams.

The mesh is preferably a chain link mesh, further comprising means against fouling and corrosion.

An aquaculture net according to the invention has an octagonal bottom chain link mesh comprising one or more mesh parts cut in angles of 45° or 90°.

FIG. 5 illustrates a normal chain link mesh structure in the form of a rectangle. This rectangular form is the normal form when making chain link mesh structures.

For manufacturing a chain link mesh structure in the form of a triangle under a top angle of 45°, a rectangular structure may be manufactured similar to FIG. 5 and thereafter the chain link mesh may be cut off as illustrated in FIG. 6. Alternatively, when manufacturing the chain link mesh structure, an operator may end the chain link sooner or later than the previous one, thereby avoiding the cutting operation and the loss of material.

For manufacturing a chain link mesh structure in a triangle under a top angle of 90°, the chain link mesh is cut off every next mesh as illustrated in FIG. 7 or, alternatively, an operator ends the chain link one mesh earlier than the previous chain link.

For manufacturing a regular octagonal shaped chain link mesh in one single piece and starting from a square and cutting of the four corners in an angle of 45°, the chain link mesh is cut off every next mesh as illustrated in FIG. 8.

In a further embodiment the aquaculture net according to the invention is foldable. WO 2007/031352 by Applicant describes a method of manufacturing a folded/foldable aquaculture net having a bottom, a front, back, left and right side wall. Some parts forming the side wall are foldable or have been folded over a diagonal of the parts. The advantage of folding is that the aquaculture net of the present invention can be assembled in the plant where the chain link mesh structures are made and can be fit onto a truck for transporting to the beach or the sea.

The aquaculture net is to be made of a structure or material, which allows folding. The net can be made of a polymer such as polyethylene, polyester or polyamide. The net can also be made of a chain link fence of metal wires, e.g. steel wires where the steel wires are provided with a corrosion-resistant coating and/or an antifouling coating. Preferably the steel wires are provided with a copper-nickel coating, where the nickel provides the necessary corrosion resistance in a marine environment and where the copper provides the anti-fouling property. The chain link fence structure allows some flexibility and shifting of one steel wire with respect to an adjacent steel wire. According to WO-A-2007/031352, the chain link fence allows folding along a diagonal even if the chain link fence is made of steel wires.

The chain link fence can also be made of copper alloy wires or of titanium wires.

The aquaculture net also comprises one or more ropes, e.g. plastic coated steel wire ropes, which support the net during use and which may carry the net during transport.

The invention claimed is:

1. An aquaculture net, comprising:
   a top in a form of a first circle having a first radius, said top being configured to attach to a raft; and
   a bottom in a form of a regular octagon, and
   wherein said aquaculture net is made of chain link fences of wires selected from a group consisting of steel, steel with copper-nickel coating, copper alloy and titanium.

2. The aquaculture net according to claim 1, wherein said octagon is formed by eight parts having forms of equilateral triangles with a top angle of 45°.

3. The aquaculture net according to claim 1, wherein said octagon is formed by four parts having forms of equilateral triangles with a top angle of 90° and by a cross formed by five square parts.

4. The aquaculture net according to claim 1, wherein said octagon is formed out of one single piece of chain link fence.

5. The aquaculture net according to claim 1, wherein the octagon is inscribed in a second circle having a second radius, and wherein the second radius of the second circle of said octagon is substantially equal to the first radius of said top.

6. The aquaculture net according to claim 1, wherein the octagon is inscribed in a second circle having a second radius, and wherein the second radius of the second circle of said octagon is smaller than the first radius of said top.

7. The aquaculture net according to claim 1, wherein said aquaculture net is foldable or folded.

8. The aquaculture net according to claim 1, wherein said aquaculture net is made of steel wires with a wire diameter that is smaller than 4.5 mm.

9. The aquaculture net according to claim 1, wherein said aquaculture net has length-width-depth dimensions which are greater than 1 m×1 m×1 m.

10. The aquaculture net according to claim 1, wherein the octagon is inscribed in a second circle having a second radius, and wherein the second radius of the second circle of said octagon is greater than the first radius of said top.

11. An aquaculture net comprising:
    a top in a form of a first circle, said top being configured to attach to a raft; and
    a bottom in a form of a polygon comprising five or more edges,
    wherein said polygon is inscribed in a second circle, and
    wherein said polygon has a surface area that is greater than a surface area of a square inscribed in said second circle.

12. The aquaculture net according to claim 11, wherein the polygon is a regular octagon.

13. A method of manufacturing an aquaculture net having a top for attaching to a raft in a form of a circle, said method comprising the steps of:
    a) providing chain link mesh structures in forms of equilateral triangles, wherein an operator ends the chain link one mesh earlier than a previous chain link, b) assembling the chain link mesh structures of step a) as to form a polygonal bottom, c) connecting said polygonal bottom to a chain link mesh forming a side wall, and d) connecting said side wall to the raft.

14. A method of manufacturing an aquaculture net having a top for attaching to a raft in a form of a circle, said method comprising the steps of:
    a) providing one or more chain link mesh structures, each structure being in a form of an equilateral triangle, wherein an operator ends the chain link one mesh earlier than a previous chain link,
    b) providing one or more chain link mesh structures in a form of a square,
    c) assembling the chain link mesh structures of steps a) and b) as to form a polygonal bottom,
    d) connecting said polygonal bottom to a chain link mesh forming a side wall, and
    e) connecting said side wall to the raft.

* * * * *